Nov. 13, 1923.
H. H. ALLYN
SELF SEALING TIRE TUBE
Filed Oct. 12, 1922
1,474,011
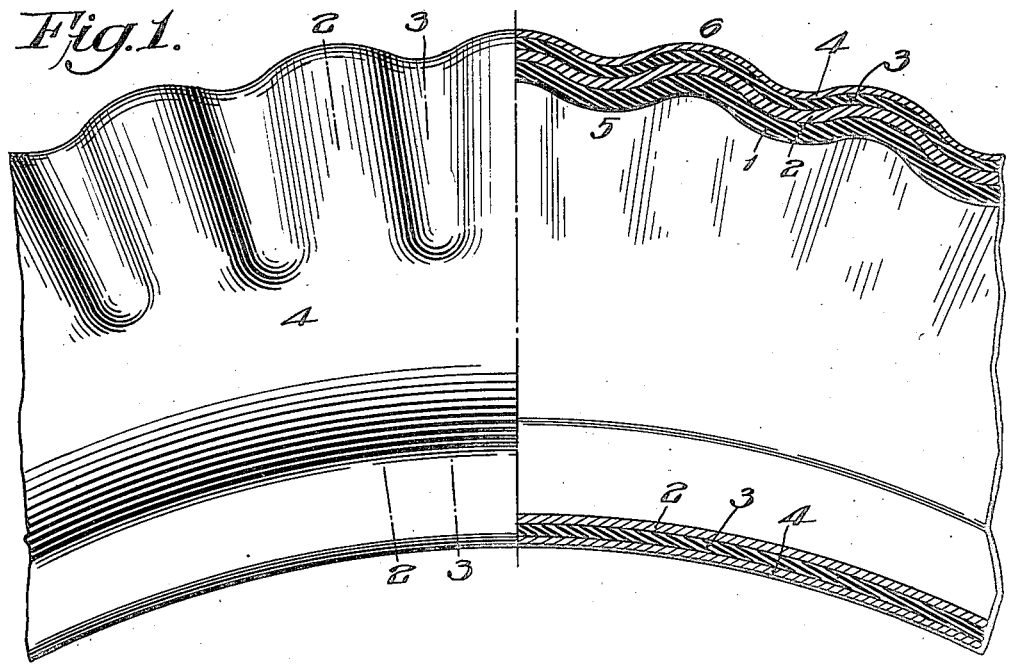
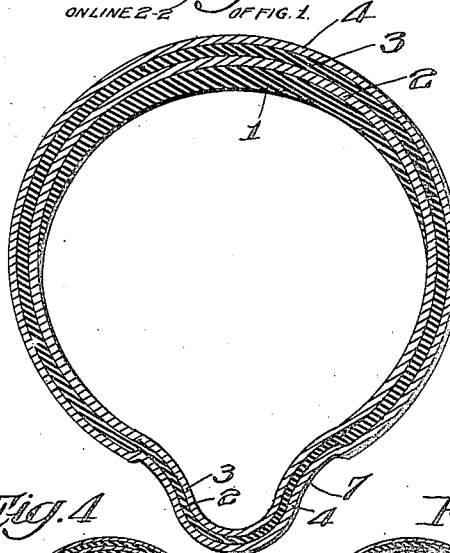
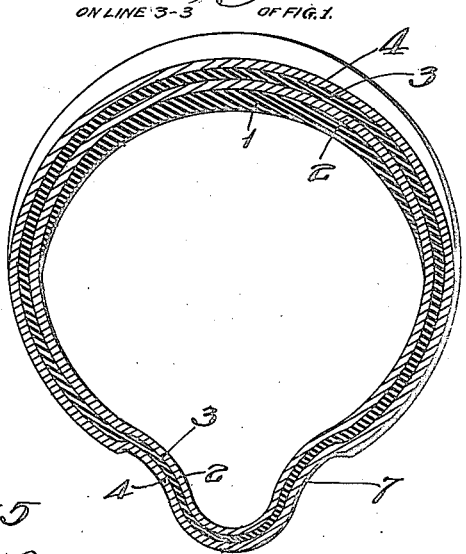
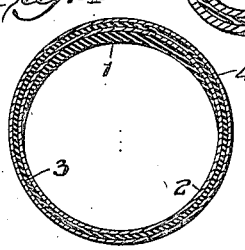
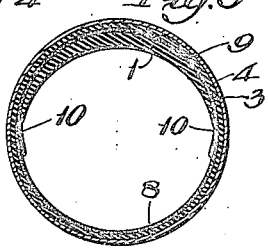
INVENTOR:
Harley H. Allyn.
BY
ATTORNEYS.

Patented Nov. 13, 1923.

1,474,011

UNITED STATES PATENT OFFICE.

HARLEY H. ALLYN, OF ATLANTIC CITY, NEW JERSEY.

SELF-SEALING TIRE TUBE.

Application filed October 12, 1922. Serial No. 593,938.

*To all whom it may concern:*

Be it known that I, HARLEY H. ALLYN, a citizen of the United States, residing at Atlantic City, county of Atlantic, State of New Jersey, have invented a new and useful Self-Sealing Tire Tube, of which the following is a specification.

The object of my present invention is to devise a novel inner tube for automobile tires which in case of puncture will cause the aperture thus formed to be effectively sealed, which will prevent slow leaks and also leaks due to the inner tube being pinched or distorted by the outer shoe, the result of which is that a greater mileage may be obtained than if the ordinary construction of inner tube is employed, and in case of puncture the apertures formed will be automatically sealed.

With the above and other objects in view which will hereinafter more fully appear, my invention comprehends a novel construction of a self sealing inner tube for automobile tires.

It further comprehends a novel construction of a balanced tube comprising a plurality of plies or layers of the ordinary tube stock or fabric between which is disposed a ply or layer of unvulcanized material, and an inner layer of unvulcanized material is provided which preferably extends throughout and beyond the tread zone of the tire shoe.

It further comprehends a novel construction of a self sealing inner tube wherein the outer periphery is provided with corrugations, so that, when the tube is in place within a shoe and is inflated, a circumferential compression of the material at the outer periphery is provided which compresses the nonvulcanized material so that it is materially more efficient in the effective sealing of any puncture which may occur.

Other novel features of construction and advantage will hereinafter more clearly appear in the detailed description and the appended claims.

For the purpose of illustrating my invention, I have shown in the accompanying drawings typical embodiments thereof which are at present preferred by me, since these embodiments will be found in practice to give satisfactory and reliable results.

It is, however, to be understood that the various instrumentalities of which my invention consists can be variously arranged and organized and that my invention is not limited to the precise arrangement and organization of these instrumentalities as herein shown and described.

Figure 1 represents, in side elevation and partly in section, a self sealing inner tube, embodying my invention.

Figure 2 represents a section on line 2—2 of Figure 1.

Figure 3 represents a section on line 3—3 of Figure 1.

Figure 4 represents, in transverse section, another embodiment of my invention.

Figure 5 represents, in transverse section, another embodiment of my invention.

Similar numerals of reference indicate corresponding parts.

Referring to the drawings.

The inner tube embodying my invention is preferably formed on a pole, the stock being formed to proper dimensions. The half moon or crescent shaped stock of unvulcanized material which forms the layer or ply 1 is first placed on the pole. The inner tube 2 is then applied around the pole and on the outer periphery of this tube is placed the sealing stock which is unvulcanized and which forms the sealing layer or ply 3. The valve mechanism can now be secured in position. The outer tube stock 4 is then applied over the sealing layer to form the outer layer or ply 4 which completes the building of a tube with the exception of the splice. The tube is now taken off the pole or form and spliced together and is thereafter placed in a vulcanizing mold and vulcanized. The vulcanizing mold is formed with a wave or corrugation at its inner periphery, so that, after the multiple ply tube has been vulcanized, the outer periphery will have the formation seen in the drawing, so that the inner curved portions 5 alternate with the outer curved portions 6, or, in other words, a corrugated formation is provided, and the depth of these corrugations preferably decreases toward the transverse diameter of the tire in cross section and at such or in proximity to such transverse diameter merge into the outer peripheral wall of the multiple ply inner tube. The vulcanizing mold is preferably so formed that the material will be compressed at the rim portion to provide a clearance 7 for the flap, which is ordinarily employed in conjunction with inner tubes after they are placed within the outer shoe.

My present invention is not limited to having the inner tube of the formation seen in Figures 1, 2 and 3 at its inner portion, and the inner tube may be formed circular in cross section as illustrated in Figures 4 and 5.

In some cases it is advantageous, instead of making the layer 2 of tube stock, to form it of cord fabric or its equivalent and in Figure 5, I have shown this layer as being formed from two sections of cord fabric 8 and 9, respectively, which overlap at the sides of the tube as indicated at 10.

When the cord fabric, or its equivalent, is employed, the tube will stand a greater degree of inflation than if ordinary tube stock were employed. Special attention is directed to the fact that when the inner tube is placed within the outer shoe and inflated the inner curved portions 5 when the tire is being inflated will move outwardly to assume a circular formation and in so doing compression of the nonvulcanizable material in the inner layer 1 and the intermediate layer 3 will take place, so that a more effective sealing action will occur in case the tube is punctured.

In so far as I am aware, I am the first in the art to devise an inner tube having one or more layers of sealing material which under inflation of the tube creates a compression of such sealing material, and it is therefore to be understood that I desire my claims to such features to receive the generic interpretation to which I am entitled.

When a tube embodying my invention is employed and a puncture occurs, the sealing material of nonvulcanizable material will effectively seal the aperture when the tack, nail or other puncturing element has been withdrawn, so that the tire does not deflate sufficiently to interfere with its operation.

In my present invention, I form a balanced inner tube consisting of an inner and outer tube of the regular tube stock, the inner layer being preferably of fabric with a filler extending around between the two layers of such nature that it is impossible for any air to leak through.

I also employ an inner layer of sealing material and by this construction there is no danger of pinching the tube when a tire is being applied to the rim or when a defective flap is employed. The tubes are preferably made of a size to fit the outer shoe or casing and are therefore only subjected to strain by compression.

Owing to the novel construction of tube bruises are prevented since a cushion is provided between the air and the casing which absorbs any shock to which the tire is subjected.

Where the inner layer or ply 2 is formed of fabric, the fabric is cut on the bias and preferably made in sections so that overlapping joints will be formed at the sides. I preferably form this layer or ply 2 of fabric as it enables one to employ a high degree of pressure within the tube. This high pressure to a degree contributes to prevent blow outs.

It will now be apparent that I have devised a new and useful self sealing tire tube which embodies the features of advantage enumerated as desirable in the statement of the invention and the above description, and while I have, in the present instance, shown and described embodiments thereof which will give in practice satisfactory and reliable results, it is to be understood that these embodiments are susceptible of modification in various particulars without departing from the spirit or scope of the invention or sacrificing any of its advantages.

Having thus described my invention, what I claim as new and desire to secure by Letters Patent, is—

1. An inner tube having a plurality of layers, one of which is of nonvulcanized sealing material and having its tread portion transversely corrugated, whereby when the tube is inflated the sealing material will be circumferentially compressed.

2. An inner tube having a plurality of layers of vulcanized material with a layer of non-vulcanized sealing material between them and with a layer of non-vulcanized sealing material on the inner face of the inner layer of vulcanized material throughout the tread bearing portion, the tread bearing portion of said layers being transversely corrugated whereby when the tube is inflated the sealing material will be circumferentially compressed.

HARLEY H. ALLYN.

Witnesses:
H. S. FAIRBANKS,
C. D. McVAY.